United States Patent [19]
Brickell

[11] Patent Number: 6,054,927
[45] Date of Patent: Apr. 25, 2000

[54] APPARATUS AND METHOD FOR SENSING AN OBJECT WITHIN A MONITORED ZONE

[75] Inventor: Christopher Gavin Brickell, Mukilteo, Wash.

[73] Assignee: Eaton Corporation, Cleveland, Ohio

[21] Appl. No.: 09/394,166

[22] Filed: Sep. 13, 1999

[51] Int. Cl.[7] .................................................. G08B 23/00
[52] U.S. Cl. ...................... 340/573.1; 340/573.1; 340/552; 340/556; 340/557
[58] Field of Search ................... 340/573.1, 555, 340/556, 529, 530, 557, 541, 552; 250/221, 222.1, 223 B

[56] References Cited

U.S. PATENT DOCUMENTS

| | | |
|---|---|---|
| 3,999,083 | 12/1976 | Bumgardner . |
| 4,142,116 | 2/1979 | Hardy, Jr. et al. . |
| 4,851,661 | 7/1989 | Everett, Jr. . |
| 4,973,837 | 11/1990 | Bradbeer .............................. 250/221 |
| 4,992,675 | 2/1991 | Conner, Jr. et al. . |
| 5,095,203 | 3/1992 | Sato et al. ............................ 250/222.1 |
| 5,122,796 | 6/1992 | Beggs et al. . |
| 5,243,181 | 9/1993 | Bondarev et al. . |
| 5,250,801 | 10/1993 | Grozinger et al. ................... 250/223 B |
| 5,337,251 | 8/1994 | Pastor . |
| 5,463,384 | 10/1995 | Juds . |
| 5,506,567 | 4/1996 | Bichlmaier et al. ..................... 340/555 |
| 5,600,305 | 2/1997 | Stafford et al. ......................... 340/573 |
| 5,854,588 | 10/1996 | Dockery ................................. 340/541 |
| 5,886,632 | 11/1997 | Shpater ................................. 340/541 |

*Primary Examiner*—Jeffery A. Hofsass
*Assistant Examiner*—Phung Nguyen
*Attorney, Agent, or Firm*—Tarolli, Sundhiem, Covell, Tummino & Szabo L.L.P.

[57] ABSTRACT

An apparatus for detecting the presence or absence of an object within a monitor zone includes a sensor (12) operative to sense a condition of the monitored zone (Z) and provide a sensor signal indicative thereof. The sensor signal is processed, preferably according to two different transfer functions, to provide first and second signals that vary based on the sensor signal. A comparator (46) provides a comparator signal that varies as a function of the first and second signals. Additional circuitry (58) is operative to provide an indication of the presence or absence of an object within the monitored zone (Z) as based on the comparator signal.

26 Claims, 4 Drawing Sheets

Fig. 4

| | | |
|---|---|---|
| 100 | Power ON | |
| | Initialize all registers, peripherals | |
| | Delay 10ms | 'wait while the system stabilizes |
| | Enable CountP1 | 'clear and start counter CountP1 which counts state changes at port 60 |
| | Timer=60ms | 'measure the state changes with no pulsed signal |
| | WHILE Timer>0 | 'use a long time base to get a good value, initial noise value during T1 |
| | LOOP | |
| | R1=(CountP1)/60 | 'R1 is the number of state changes per millisecond for noise |
| | R2=R1 | 'also, set initial value for response |
| 102 | 'now begin the repeating normal operation of the sensor module 10 | |
| | DO | 'run this loop forever |
| |    'emit a pulse for 10us then wait another 10us recovery time-duration is T2 | |
| |    Enable CountP1 | |
| |    Timer=10us | 'emit a 10 microsecond pulse |
| |    Port 70=0 | 'turn on the LED 20 |
| |    WHILE Timer>0 | 'run the timer for duration Tp |
| |    LOOP | |
| |    Port 70=1 | 'turn off the LED 20 |
| |    Timer=10us | 'set the recovery time |
| |    WHILE Timer>0 | 'run the timer to complete duration T2 |
| |    LOOP | |
| 104 | 'compute the response status-note that in an interrupt driven system, this function could occur during duration T3 | |
| | R2A=50*(CountP1) | 'R2A is the number of signal response state changes per millisecond |
| | R2=R2+0.125*(R2A-R2) | 'update the average signal response value including exponential smoothing thereof |
| 105 | R=R1/R2 | |
| 106 | IF R<0.8 THEN | 'set the threshold for a valid signal to 0.8 |
| |    'implement some integration to limit potential for false decisions | |
| |    IF CountP3<4 THEN | 'don't increment if count is at maximum |
| |       CountP3=CountP3+1 | 'increment for a detection |
| |    END | |
| | ELSE | 'this is for a non-detect, ie R≥0.8 |
| |    IF CountP3<0 THEN | 'don't decrement if count is at minimum |
| |       CountP3=CountP3-1 | 'decrement for non-detection |
| |    END | |
| | END | |
| 108 | IF CountP3=4 THEN Port 76=1 | 'turn the output ON |
| | IF CountP3=0 THEN Port 76=0 | 'turn the output OFF |
| 110 | 'wait for T3 for all signals to return to the quiescent state | |
| | Timer=RandomTime+60us | 'set duration T3 to 60 microseconds plus a random time to vary the repeat interval |
| | WHILE Timer>0 | 'this is duration T3 |
| | LOOP | |
| 112 | 'measure the noise level for duration T1 | |
| | Enable CountP1 | 'clear and start counter CountP1 which counts state changes at port 1 |
| | Timer=130us | 'measure the noise state changes with no triggered signal for 130 microseconds |
| | WHILE Timer>0 | 'this is duration T1 |
| | LOOP | |
| | N1=(CountP1) | |
| 114 | R1A=100*N1/13 | 'R1A is the number of state changes per millisecond |
| 116 | R1=R1+0.1*(R1A-R1) | 'update the average noise response value including exponential smoothing thereof |
| | LOOP | 'continue with successive T2-T3-T1 cycles at step 102 |

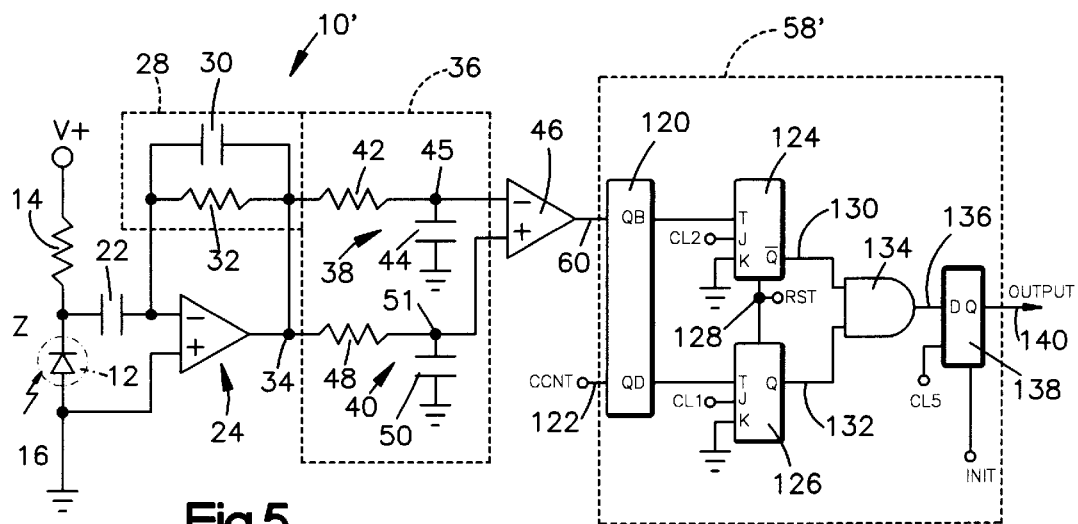
Fig.5
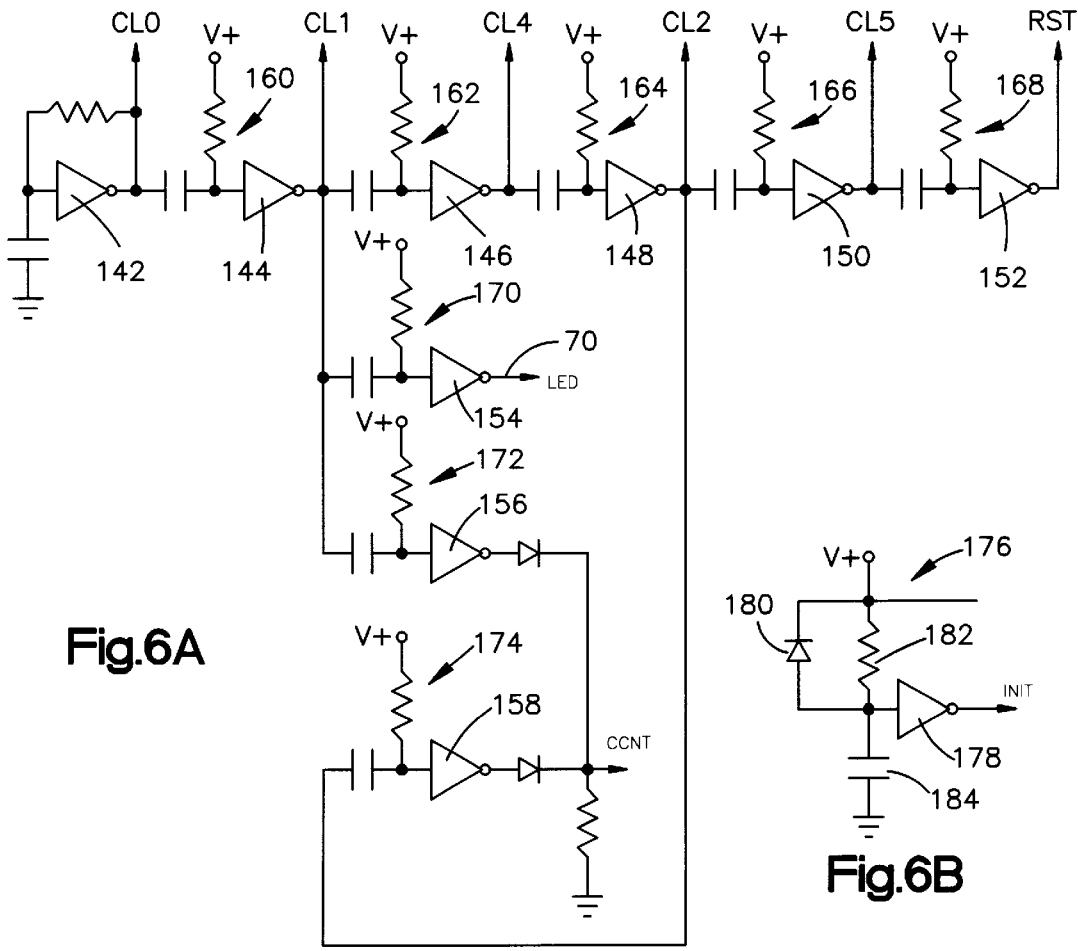
Fig.6A
Fig.6B

APPARATUS AND METHOD FOR SENSING AN OBJECT WITHIN A MONITORED ZONE

TECHNICAL FIELD

The present invention relates to an apparatus and method for sensing the presence of an object within a monitored zone and, more particularly, to an apparatus and method for sensing the presence of an object within a monitored zone with improved tolerance to noise.

BACKGROUND OF THE INVENTION

Numerous types of detection systems have been derived for detecting the presence of an object within a monitored zone. One type of detection system includes an emitter which transmits a pulse signal, such as an optical beam, into the monitored zone. A corresponding optical detector is oriented to detect the transmitted beam at an opposite side of the monitored zone. Alternatively, the optical detector may be positioned so as to detect a reflection of the transmitted beam from an object within the monitored zone. The detection of the transmitted beam is indicative of the presence or absence of an object within the monitored zone.

For example, U.S. Pat. No. 5,122,796 to Beggs et al. discloses a synchronous detection system having an electro-optical emitter that emits light into a monitored zone. An electro-optical receiver senses light reflected from an object within the monitored zone and provides a signal that is filtered by a synchronous detector. The synchronous detector excises a portion of the signal at a frequency based on the modulation frequency of the electro-optical emitter. Accordingly, the detector operates when a reflected pulse is expected, thereby screening out noise and other signals during intervals when no reflected pulse is expected.

U.S. Pat. No. 5,243,181 to Bondarev et al. discloses a synchronous detection system in which a transceiver emits light pulses into a monitored zone. The transceiver receives light pulses that are reflected back to the transceiver when an object is present. The transceiver, in turn, generates an output signal indicative of whether an object is present in a monitored zone. If the transceiver detects potentially interfering noise at a time other than when the light signal is emitted, such as detecting a noise level above a fixed detection threshold, then no pulse is generated for a preselected time period. The effects of noise also are reduced by tracking the number of pulses emitted but not received and by generating successive pulses at different frequencies.

U.S. Pat. No. 5,463,384 to Juds discloses an example of a collision avoidance system for a vehicle that utilizes a fixed threshold synchronous detection system. The disclosed systems includes a sensor for producing detection signals in response to receiving a reflected energy beam.

U.S. Pat. No. 4,851,661 to Everett, Jr. discloses a ranging system that includes a programmable array of optical emitters that are controlled to vary the intensity of emitted light. The system also includes an optical receiver having separately adjustable threshold detectors to facilitate a range determination of an object detected within a monitored zone.

In systems utilizing a fixed detection threshold, the threshold typically is selected based on the worst case expected noise condition to ensure a satisfactory of noise rejection. A consequence of this approach is to decrease the sensitivity of the system when the signal-to-noise ratio worsens. Conventional sensors often are expected to operate in widely varying or noisy environments, for example, in an environment with an electrical field of about 50 volts per meter over a frequency range from 10 MHz to about 1,000 GHz. Furthermore, performance expectations are increasing throughout the world for use of detection systems in the presence of impressed noise caused by external sources, such as variable frequency drives, load switching, static discharge, etc., such as expressed in the IEC 61000-4 series of standards.

In the example of a photoelectric detection system without additional ambient illumination, very little DC photocurrent is produced in the photodetectors, resulting in very little shot noise. However, when the system is operated under bright daylight conditions, there is significant DC photocurrent in the receiver photodetectors, which results in higher shot noise levels. The root mean square of DC photocurrent $I_n$ (RMS shot noise current) produced in a silicon photodiode is determined by the equation: $I_n = 5.66 * 10^{-10} \sqrt{(I_{dc} * BW)}$; the units being amps rms, where $I_{dc}$ is the DC photocurrent and BW is the circuit bandwidth in Hz. Whenever electric current flows in the photodetector, such as when the photodetector views a white target in bright sunlight, the photocurrent generates shot noise at a level that is many times greater than the intrinsic electronic noise of the receiver amplifier itself. To avoid false detection caused by a high level of shot noise, the required threshold must be quite large in comparison to the worst case scenario for the shot noise. This high threshold, however, results in low system capability of detecting very dark, low reflective targets in all lighting conditions.

In order to address the deficiencies of fixed threshold systems, detection systems have been devised that adaptively adjust the threshold based on a measurement of the noise statistical characteristics. The noise measurement is used to set the detection threshold of the receiver. In this way, such adaptive systems are able to optimize their sensitivity relative to the ambient measured receiver noise levels in order to maintain adequate signal reception integrity. Examples of systems utilizing an adaptive threshold are disclosed in U.S. Pat. No. 3,999,083 to Bumgardner, U.S. Pat. No. 4,142,116 to Hardy, Jr. et al., U.S. Pat. No. 4,992,675 to Conner, Jr. et al., and U.S. Pat. No. 5,337,251 to Pastor.

It has also been suggested to statistically process signals in a detection system using filters having differing time constants. Each filter provides an output signal to a comparator that, in turn, determines the direction of a counter. The counter counts between limit values, such as between zero, which indicates a non-detect state, and N, which indicates a detect state, based on sampling the output of the comparator. The statistical nature of the processing algorithm requires that the peak signal and peak flyback pulse which are sampled at the output of the comparator be nominally of about the same magnitude. The output of the comparator is sampled at two points in time, indicated at S1 (e.g., corresponding to the peak signal) and at S2 (e.g., corresponding to the flyback pulse of the peak signal). Because the output of the comparator is either HIGH or LOW, the two sampling points provide four possible outcomes. Assuming a Gaussian distribution for noise, then the output of the detector when sampled at times S1 and S2 may be expected to be:

| S1 | S2 | OUTPUT | DESCRIPTION |
|---|---|---|---|
| LOW | LOW | — | Non-detect assumption causing count down |
| LOW | HIGH | — | Non-detect assumption causing count down |
| HIGH | LOW | + | Correct detect decision causing count up |
| HIGH | HIGH | — | Non-detect assumption causing count down |

Each state has a nominally 25% probability of being reached, and that the HIGH-LOW state statistically has greater than a 50% likelihood when there is a signal to detect. In this approach, the false detect signals and false non-detect signals, however, operate to lengthen the time to reach a true output state (e.g., zero or N). In addition, statistical assumptions have been made which require the peak signal at time S1 and the peak flyback signal pulse at time S2 to be nominally at about the same absolute amplitude.

SUMMARY OF THE INVENTION

A first embodiment of the present invention is directed to a sensing apparatus that includes a sensor operative to sense a condition of a monitored zone and provide a sensor signal indicative thereof. The sensor signal is processed to provide first and second signals that vary according to the sensor signal. A comparator compares the first and second signals and provides a comparator signal that varies as a function of the first and second signals. Additional circuitry is operative to provide an indication of the presence or absence of an object within the monitored zone based on the comparator signal.

Another embodiment of the present invention, is directed to a sensor module that includes a sensor operative to sense a condition of a monitored zone and provide a sensor signal indicative thereof. The sensor signal is processed by different transfer function operations to provide first and second processed signals. A comparator provides a comparator output signal having a characteristic that varies as a function of the first and second processed signals. The sensor module also includes circuitry operative to determine a change in the condition of the monitored zone indicative of the presence or absence of an object within the monitored zone based on the comparator output signal.

Yet another embodiment of the present invention is directed to a method for detecting the presence or absence of an object within a monitored zone. The method includes the steps of sensing a condition of the monitored zone and providing a sensor signal indicative of the sensed condition. At least two different transfer function operations are performed on the sensor signal to provide first and second processed signals. The first and second processed signals are compared to provide a comparison signal that varies between at least two conditions. An indication of the presence or absence of an object within the monitored zone is provided based on the comparison signal.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 4 is an algorithm illustrating operation of part of the module of FIG. 1 in accordance with a second embodiment of the present invention;

FIG. 5 is a circuit diagram illustrating a sensor module in accordance with a third embodiment of the present invention;

FIGS. 6A and 6B are examples of pulse generation circuits for use in connection with the module of FIG. 5;

DESCRIPTION OF PREFERRED EMBODIMENTS

Figure 1:
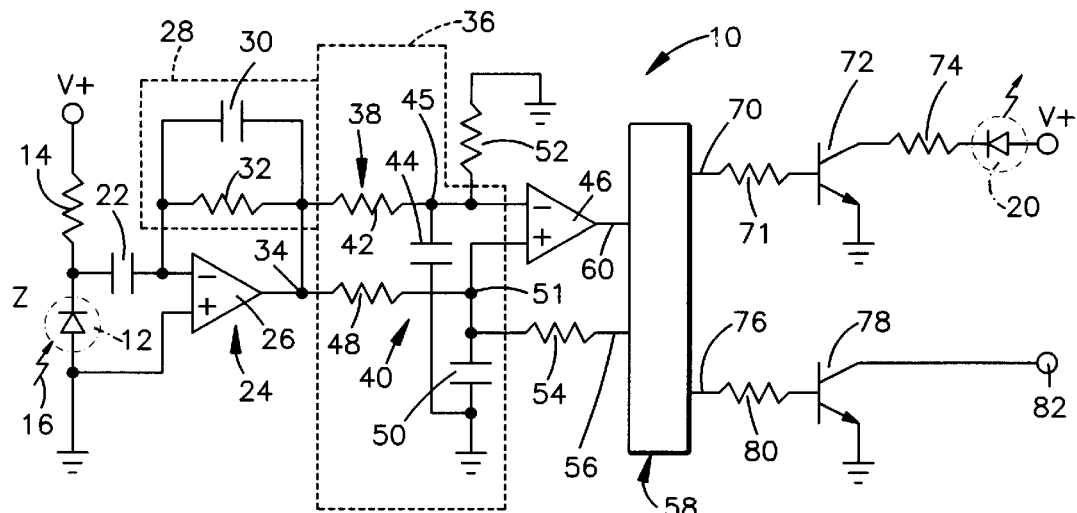
FIG. 1 is a circuit diagram illustrating a sensor module in accordance with a first embodiment of the present invention.

FIG. 1 illustrates a sensor module 10 for detecting the presence or absence of an object located within a monitored zone, indicated at Z. The module 10 includes a sensor 12 operative to sense a condition of the monitored zone Z and to provide a sensor signal having an electrical characteristic that varies as a function of the sensed condition. The sensor 12 may be any device or circuit capable of receiving signals emitted into the monitored zone Z. For example, the sensor may be configured to detect acoustic signals (e.g., ultrasonic), light signals (e.g., infrared or visible light), microwave signals or any other type of energy signal.

In this embodiment, the sensor 12 is formed of a photodetector diode operative to sense light within the monitored zone Z, such as having an infrared frequency. For purposes of simplification of explanation, the sensor 12 will hereinafter be referred to as the photodetector diode 12. The photodetector diode 12 has an anode connected to electrical ground and a cathode electrically connected to a positive voltage level V+ through a resistor 14. Optically induced reverse current through the photodetector diode 12 increases in response to sensing illuminated light 16 within the monitored zone Z. The photodetector diode 12 conducts photocurrent as a function of the light 16 received. The light 16 may include light from many sources, including ambient lighting, momentary and stray light, and light from an emitter 20, such as a light emitting diode (LED). While the photodetector diode 12 and the LED 20 are illustrated as being separate, they alternatively might be incorporated into a signal transceiver. It further will be understood that the emitter 20 is configured to emit signals capable of being sensed by the sensor 12.

Preferably, the emitter 20 is an LED that emits light pulses into the monitored zone Z. For purposes of simplification of explanation, the emitter 20 is hereinafter referred to as an LED. The positioning of the photodetector diode 12 and the LED 20 is a matter of design choice. The photodetector diode 12, for example, may be arranged on an opposite side of the monitored zone Z to receive light directly transmitted by the LED 20. Alternatively, the photodetector diode 12 and LED 20 may be arranged so that the diode receives light transmitted by the LED 20 which is reflected off an object located within the monitored zone Z.

The photocurrent signal generated by the photodetector diode 12 in response to sensing light 16 is filtered through a high-pass-filtering capacitor 22. The capacitor 22 removes unwanted signal components and noise with lower than a desired frequency. The capacitor 22 is connected between the cathode of the photodetector diode 12 and an input to an amplifier circuit 24. Specifically, the filtering capacitor 22 provides a filtered signal, which is indicative of the sensed light 16, to an inverting input of an operational amplifier (op-amp) 26. A non-inverting input of the op-amp 26 is connected to electrical ground. The amplifier circuit 24 operates as a trans-resistance amplifier that amplifies the filtered signal from the capacitor 22 to a useable level.

The amplifier circuit 24 also preferably includes a feedback filter 28, for example formed of a parallel combination of a capacitor 30 and a resistor 32. The filter 28 is connected as feedback between the inverting input of the op-amp 26 and its output, indicated at 34. The filter 28 band limits the output of the amplifier 26, further reducing unwanted signals and noise with higher than desired frequency components.

The corner frequencies of filter circuits 22 and 28 are selected to ensure that the level of the desired signals is maximized relative to the level of undesired signals. This provides a desired amplified, filtered signal at the output 34 of the op-amp 26.

The signal generated at 34 is processed to provide first and second signals, each of the signals having a characteristic that varies as a function of the sensor signal. Each of the signals has a different signal response, including different phase and/or amplitude components, based on the signal generated at 34.

In this embodiment, the desired processing is accomplished by a dual transfer function circuit 36 formed of individual circuits 38 and 40 which have different transfer functions. Preferably, the circuits 38 and 40 are configured as first order low pass filters having different transfer functions. In particular, the filter 38 is formed of a resistor 42 and a capacitor 44 connected between the output at 34 of the amplifier 24 and an inverting input, indicated at 45, of a comparator circuit 46. The second filter 40 also is formed of a resistor 48 and a capacitor 50 connected between the output at 34 of the amplifier 24 and a non-inverting input, indicated at 51, of the comparator circuit 46.

The values of the components of circuits 38 and 40 are selected so that the signals provided by circuits at 45 and 51 have different amplitude and phase responses to the amplified signal generated at 34. For example, the resistor 42 and capacitor 44 are selected to provide filter 38 with a longer time constant than that provided by resistor 48 and capacitor 50. Consequently, the signal provided by the filter 40 at 51 varies more rapidly in response to the signal at 34 relative to the signal provided by the filter 38 at 45.

The effects of variations in the amplified signal at 34 that are relatively lower in frequency content than the cut-off frequency of each filter 38, 40 also are minimized in the arrangement of FIG. 1. This is because the signals at the inputs to the comparator 46 contain a difference caused by the signal variation at 34. This difference further reduces as the variation in frequency content reduces. That is, if the filter 38 has a longer time constant than the filter 40, the filter 38 tends to smooth out the signal 34 more than the filter 40. The input signal to the non-inverting input 51 of the comparator 46 thus is more responsive to changes and noise. Consequently, when the signals at 45 and 51 are processed by the comparator 46, these low frequency variations are substantially minimized. Such frequency variations may, for example, come from a drift in the signal at 34 of the amplifier 24 as well as from low frequency modulation of the photodetector diode 12.

A resistor 52 is connected between the inverting input of comparator 46 (i.e., at 45) and electrical ground. Another resistor 54 is connected between the non-inverting input (i.e., at 51) and a port 56 of associated circuitry 58 where a bias may be usefully introduced. These resistors 52 and 54 select the level at which the output state of the comparator 46 changes by biasing the output response of the comparator 46. A selectable voltage level is provided at port 56, such as through a digital-to-analog converter (not shown) of the circuitry 58. The voltage level at port 56 sets the bias level at the non-inverting input of the comparator 46. The resistor 52 balances this circuit to obtain a desired operation of the comparator 46 based on the equation:

$$R54/(R48+R54)=R52/(R42+R52).$$

Accordingly, as the voltage level at port 56 of circuitry 58 increases, a greater difference between the input signals at the inverting and non-inverting inputs is required to change the state of the comparator 46. The voltage level at port 56 also may be used to estimate the amplitude of noise present at the output at 34.

The particular arrangement of the filters 38 and 40 illustrated in FIG. 1, may be modified by omitting the capacitor 50. The circuits 38 and 40 still have different transfer functions that provide differing signal responses at 45 and 51 to the comparator 46. The resistor 48 may be retained to reduce the temperature effects of bias current at 51 relative to the signal at 45, and may be included if the resistor 54 is included. Where a small amount of positive feedback is added to the circuit, such as provided by the resistor 54 being connected to output 60 of comparator 46 rather than port 56 of circuitry 58, a small amount of hysteresis may be introduced to reduce the occurrence of transitions for small signal differences between the comparator inputs. Alternatively, the capacitor 44 may be omitted, provided that the capacitor 50 is retained.

Furthermore, various other circuit arrangements, including higher order filters having different transfer functions, may be used in place of the filter circuits 38 and 40. The transfer functions may also be implemented as analog circuits, digital circuits, or within a microcontroller. All that is necessary is that the combined transfer function operation performed on the signal from the photodetector diode 12, including the transfer function operations of the amplifier 24 and the circuits 38 and 40, results in different signal responses being provided to the comparator inputs at 45 and 51.

The comparator 46 compares the signals at 45 and 51 and provides an output signal at line 60 to the circuitry 58. The comparator output signal at 60 has an electrical characteristic that varies between at least two conditions or states as a function of the relative value between the input signals at 45 and 51.

Figure 2:
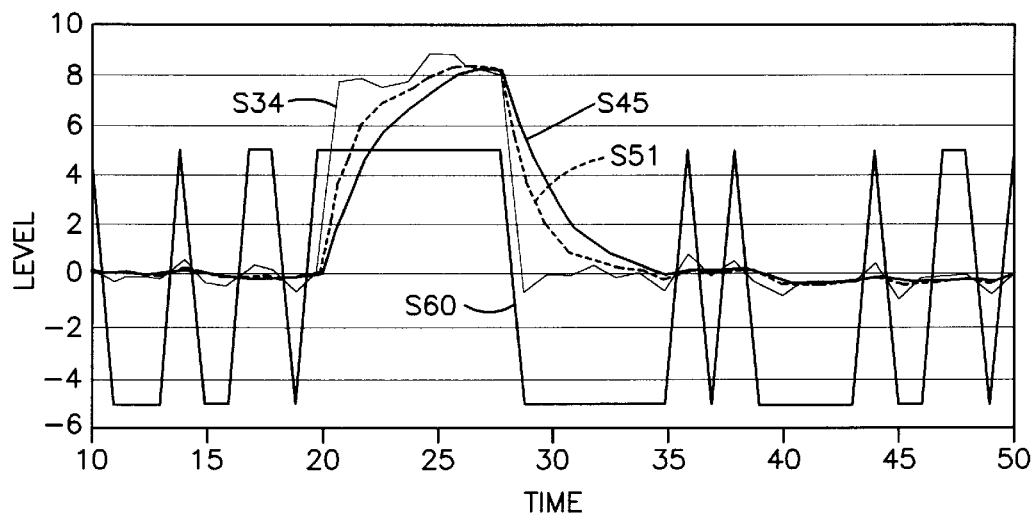
FIG. 2 is a graphical representation of selected waveforms from the circuit of FIG. 1.

The function of the comparator 46 may be better understood with reference to the signal diagram of FIG. 2. A signal S34 shows a representation of the amplified response signal at 34, which is input to the transfer function circuits 38 and 40. The signal S34 includes random noise, which may include noise from illumination of the photodetector 12 by unwanted light, from the electrical components of the module 10 or from amplification of the noise and sensor signal from photodetector 12. The portion of the signal S34 at a higher level, between about 20 and about 28 units of time, corresponds to illumination of the photodetector 12 by a light pulse emitted by the LED 20.

A signal S51 shows the signal response provided at 51 to the non-inverting input of the comparator 46 by the circuit 40. A signal S45 similarly shows the response provided at 45 to the inverting input of the comparator 46 by circuit 38. Significantly, the signal S51 responds more rapidly than signal S45 when the signal S34 rose sharply at about 20 units of time as well as when the signal S34 fell sharply at about 28 units of time. This is due to the different transfer functions (i.e., different time constants) of the circuits 38 and 40 that operate on the signal at 34. A signal S60 illustrates the signal at the output 60 of the comparator 46 operating as previously described.

A closer inspection of FIG. 2 demonstrates that when there is only random variation in the signal S34, such as prior to about 20 units of time and greater than 35 units of time, the signal S60 changes states more frequently than when a light pulse is detected between about 20 and 28 units of time. One of the states of the signal S60 corresponds to a signal level above a predetermined reference level, such as zero volts, and the other state corresponds to a signal level below the reference level. That is, each change from one state to the other state results in a crossing through the reference level.

Figure 3:
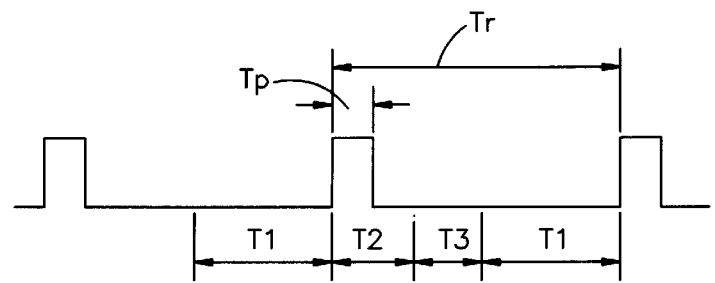
FIG. 3 is a timing diagram illustrating operation of the sensor module of FIG. 1.

The comparator output signal S60 exhibits a significantly higher rate of state transitions when there are only random variations in the signal S34 than when the light pulse is present. Consequently, the presence a light pulse illuminating the photodetector diode 12, such as emitted from LED 20, may be inferred based on the rate of state transitions of the signal S60. With reference to FIGS. 2 and 3, the presence of a light pulse may be determined as an arithmetic function based on the number of state transitions of signal S60 before the occurrence of a pulse (e.g., over a time interval T1=time 10 units to 20 units) relative to the number of state transitions during the occurrence of a light pulse and its recovery (e.g., over a time interval T2=time 20 units to 35 units By way of example, if the number of the state transitions N1 during time T1 is 9 and the number of state transitions N2 during time T2 is 1, then a ratio N=N2/N1=⅑. It would be expected that, statistically speaking, the number of state transitions in any equal time intervals when no pulse signal is present relative to the number of state transitions when a signal pulse is present would be approximately equal. As a result, the presence of a pulse may be inferred from determining that the ratio N is less than 1. The value of the ratio N that reliably corresponds to a real detected signal may thus be determined from the statistics of the noisy signal S34 when no light pulse is present. In situations when the amount of noise is small compared to the desired signal, then a value of the ratio N close to unity may be an appropriate threshold level. When the amount of noise is large when compared to the signal, a lower value of the ratio N typically is used as a threshold for determining the presence of the light pulse in the monitored zone Z.

Similarly, if there is a significant difference in the number of transitions or counts, N1–N2 could equally be used to infer the presence or absence of a pulse. For example, N1–N2>9 would infer the presence of a pulse, and 3<N1–N2<9 would infer uncertainty in pulse presence, and 3>N1–N2 would infer no pulse present. Referring back to FIG. 1, the circuit 58 receives the comparator output signal at 60. In this embodiment, the circuit 58 preferably is a microprocessor or microcontroller programmed to process the comparator output signal at 60 and determine the presence or absence of an object within the monitored zone Z as a function of the comparator signal. Specifically, the circuit 58 determines the number of transitions through the reference level of the signal at 60 during time intervals, such as over intervals T1 and T2 described above. The circuit 58 determines the presence or the absence of the object as a function of the number of transitions through the reference level counted during the selected time intervals.

The circuit 58 also is able to directly control the emission of light pulses from the LED 20 by providing a desired signal at output port 70. The output port 70 is connected through a resistor 71 to a transistor 72. The transistor 72 is connected to the LED 20 through a current limiting resistor 74. The signal provided at output port 70 biases the transistor 72 which, in turn, controls the operation of the LED 20. Alternatively, an appropriate signal generator or other circuitry may be used to control the LED 20, or other emitter, to emit desired pulsed signals into the monitored zone Z.

The circuit 58 also provides an output signal at port 76 which is indicative of the presence or absence of an object within the monitored zone Z. The output signal at port 76 activates a transistor 78 through an appropriate biasing resistor 80 to provide a logic output signal at 82 indicative of whether an object has been detected within the monitored zone.

While the processing of the signal at 60 for this embodiment of the present invention is described as software operating within a microprocessor, it will be understood and appreciated that the determination of the presence or absence of an object within the monitored zone Z may, in accordance with the present invention, be accomplished by hardware, software, or a combination thereof.

In FIG. 3, for example, the specific timing of the activity controlled by software running in the microprocessor 58 and is expressed relative to time intervals, including T1 and T2 as described above. During interval T1, the microprocessor 58 accumulates the number of state transitions N1 at the comparator output 60. The number of state transitions N1 conveniently may be expressed as a transition rate R1 based on the state transitions per unit time, R1=N1/T1. Time interval T2 corresponds to the pulse time interval (Tp) plus the recovery time interval in which the microprocessor 58 accumulates and stores further state transitions N2 at the comparator output 60. The second number of state changes N2 also conveniently may be expressed as a transition rate R2 based on state transitions per unit time, R2=N2/T2. Consequently, when the state transitions are normalized per unit time, the interval T1 need not be the same duration as the interval T2.

Another interval T3 provides time during which it may be determined whether an object has been detected within the monitored zone Z. This determination may be made based on a ratio R=R2/R1, as explained above. Other operations also may be performed during this interval T3 prior to repeating the cycle with another interval of T1 as well as time being provided for the system to return to its quiescent state.

The repetition rate for each cycle is illustrated as TR=T1+T2+T3. The intervals Tr and Tp each may be controlled by the microprocessor 58 so as to limit unintended synchronization of the system with other external sources of interference or to manage the average power consumed by the light emitter function. The interval Tp also may be changed to reduce the apparent gain of the system by reducing the pulse width, thereby increasing the higher spectral components in the signal relative to the band-limited amplifier 24.

Referring to FIGS. 2 and 3, as the amplitude of the signal S34 decreases (e.g., after 28 units of time), the number of state transitions during T2 may be expected to increase until, ultimately, R2 is approximately equal to R1. Provided that there is some small amount of desired signal present in the signal S34, further averaging or integration may be utilized to improve the accuracy of detection.

For example, the microprocessor 58 may include a counter function that is incremented when a detect decision is made and decremented when a non-detect decision is made. When the counter function reaches a predetermined maximum value, such as a decimal value of five, then the output port 76 is set to a value to reflect a true detect state. Similarly, when the counter reaches a predetermined minimum value, such as zero, then the output port 76 is set to a value to reflect a true non-detect state.

FIG. 4 illustrates a simplified example of a software algorithm operating in the microprocessor 58 which directly controls the emission of light pulses and determines the presence or absence of an object within the monitored zone Z. For purposes of brevity, only certain portions of the disclosed algorithm will be summarized herein, as explanatory comments are provided on selected lines. Reference numbers for selected steps of the algorithm of FIG. 1 are indicated along the left side of the algorithm.

The algorithm begins upon being powered on at step 100, in which the system is initialized to a known state and a measured level of the baseline noise is obtained without a pulse response. A counter CountP1 is enabled to count the state transitions of the comparator output signal at 60. A value R1 corresponds to an initial transition rate indicating the number of state transitions per millisecond for the ambient noise condition. An initial value for the pulse response R2 also is initially set equal to R1.

At step 102, the normal operation of the module 10 begins. The microprocessor 58 controls the LED 20 to emit a 10 microsecond pulse and then to wait another 10 microseconds of recovery time to complete the time interval T2. The counter CountP1 counts the number of state transitions detected at the output 60 of the comparator 46 during the interval T2.

At step 104, the response status is calculated. This may occur during the interval T3, as described above. A transition rate value R2A indicative of the number of signal response state transitions per millisecond is determined. R2 also is updated using exponential smoothing to provide a running average signal response value. The coefficient 0.125 has been selected to provide an averaging and smoothing function corresponding to a running average based on about 7 samples. Selecting a lower value for this coefficient increases the equivalent sampling run length used to provide the averaging function, thereby providing additional smoothing.

At step 105, the value R=R1/R2 provides a signal-to-noise ratio as a function of the number of state transitions at the comparator output 60 relative to the average signal response per unit time R2.

At step 106, integration is implemented to help limit the potential for false detections of the emitted signal. A counter CountP3 is incremented and decremented between minimum and maximum values based on the ratio value R relative to the threshold of 0.8. Specifically, if R<0.8, indicating a detected light pulse, CountP3 is incremented up to the maximum count value. On the other hand, if R≧0.8, CountP3 is decremented down to the minimum value. As stated above, the threshold value may be modified in order to obtain a greater or lesser degree of accuracy and sensitivity for a valid detect signal, typically based on the expected or existing noise level. That is, a smaller threshold value provides a more accurate, although less sensitive sensor module 10.

At step 108, the output port 76 of the microprocessor 58 is turned ON and OFF according to the value of CountP3. Specifically, if CountP3 is at the maximum value, such as a decimal value of four, the output port 76 is turned ON. On the other hand, if CountP3 is equal to the minimum value, such as 0, then the output port 76 is turned OFF.

After computing the response status, the operation of the module 10 waits for an interval T3, as described above, in which the signals return to the quiescent state at step 110. This interval T3 also may be contemporaneous with the determination of the response status at step 104.

Next, at step 112, the noise level is measured for the interval T1, such as about 130 microseconds, in which the counter CountP1 accumulates the number of state transitions at the comparator output 60. At step 114, the current value of CountP1 is converted to a transition rate value R1A indicative of the number of state transitions per unit time. At step 116, average noise response value R1 is updated and exponentially smoothed, as described with respect to the calculation of R2. The entire process repeats by looping back to step 102.

While the foregoing features of the module 10 have been described as being formed as a combination of hardware and software, it is possible to implement the function of the processing circuit 36 and the comparator 46 in software running in a microprocessor or microcomputer, such as the microprocessor of circuit 58. This requires that the amplified signal at 34 be converted into a digital format by an appropriate analog-to-digital converter, which preferably forms part of the microprocessor 58. The filtering and comparison functions may be performed in software algorithms in accordance with the following equations:

$$S45_t = S45_{t-1} + \square_1 (S34_t - S45_{t-1})$$

$$S51_t = S51_{t-1} + \square_2 (S34_t - S51_{t-1})$$

$$S60_t = SIGN(S51_t - S45_t)$$

where parameter S34 is the digitized value of the signal at 34 of FIG. 1, parameter S45 is the digitized signal at 45, S51 is the digitized signal at 51, and $S60_t$ is the computed equivalent of the comparator output signal at 60. The operator SIGN shows that the comparator is either positive or negative depending on the difference of the inputs to the comparator, and is included to develop a digital rather than analog representation of the comparator output. The subscripts $_t$ and $_{t-1}$ refer to the sampling time of the signals, namely where $_t$ is the current moment in time and $_{t-1}$ refers to a previous sampling moment. The constants $\square_1$ and $\square_2$ set time constants of the transfer functions, such as provided by the R-C networks of circuits 38 and 40 of FIG. 1. Following the example used in the circuit of FIG. 1, $\square_1$ is selected to be less than $\square_2$, with both typically being less than or equal to 1. The resulting digitized comparator signal $S60_t$ is processed within the microprocessor 58 in a manner substantially identical to that described above.

FIGS. 5, 6A and 6B illustrate an alternative embodiment of the module 10' of FIG. 1, in which the circuit 58 is implemented as digital logic, indicated as digital circuit 58'. The elements used for detecting the light signal and for providing the comparator function are substantially identical to those shown and described with respect to FIG. 1. Accordingly, identical reference numbers are used in FIG. 5 to refer to corresponding parts previously shown and described with respect to FIG. 1.

Stated briefly, a sensor, such as the photodetector diode 12, senses the condition of the monitored zone Z and provides a signal which is amplified and filtered to an appropriate as the filtered output signal at 34. The signal at 34 is then processed by the processing circuit 36 which includes first and second transfer function circuits 38 and 40. The circuits 38 and 40, for example, are low pass filters having different time constants. Therefore, the circuits 38 and 40 operate on the signal at 34 differently to provide corresponding filtered output signals at 45 and 51 that vary based on the sensor signal.

The filtered signals at 45 and 51 are provided to the inverting and non-inverting input of the comparator 46. The comparator compares these signals and, in turn, provides a comparator output signal at 60 that varies between at least two states or conditions as a function of the signals at 45 and 51.

The comparator output signal at 60 is provided to the circuit 58' which includes a counter circuit 120. The counter 120 that counts the number of state transitions of the comparator signal at 60. That is, the counter 120 effectively counts the number of zero crossings provided by the comparator output signal. The counter 120 has outputs $Q_B$ and $Q_D$. The counter 120, for example, is configured so that the output $Q_B$ transitions to a HIGH level at the second positive direction state transition of the signal at 60 following a reset command signal CCNT provided at terminal 122 thereof. The output $Q_D$ transitions to a HIGH level, such as at the $8^{th}$ positive direction state transition of the comparison signal at 60 following a reset command signal CCNT.

The outputs $Q_B$ and $Q_D$ are connected with latches 124 and 126, respectively. A reset signal RST is provided to a common reset connection 128 of the latches 124 and 126. After receiving a reset command at 128, the latch 124 is enabled by a clock pulse CL2 being HIGH. The latch 124 registers any LOW to HIGH transition at the output $Q_B$ of the counter 120 by setting a LOW output signal at line 130. Similarly, when latch 126 is enabled by a clock pulse signal CL1 being HIGH, it registers a LOW to HIGH transition of the output $Q_D$ by providing a HIGH output signal at line 132.

The outputs 130 and 132 of the respective latches 124 and 126 are connected to an AND gate 134 that provides a detection signal (DET) at 136. The detection signal DET is expected to be HIGH upon detection of a light pulse by the photodetector diode 12.

The output 136 of the AND gate 134 is connected with another latch 138. The latch 138 also has a clock input that receives a clock pulse signal CL5 and a reset input that receives an initialization pulse signal INIT. The INIT signal sets the initial state of the latch 138, such as providing a LOW output signal at 140. Provided that the DET signal at 136 is HIGH coincident with the clock pulse signal CL5, the output at 140 of the latch 138 also is set HIGH. On the other hand, if a light signal was not detected, the DET signal remains LOW and the output 140 of latch 138 is set LOW coincident with the clock pulse signal CL5.

By way of example, FIGS. 6A and 6B illustrate clock-pulse generation circuits that generate the clock pulses for the circuit of FIG. 5. The clock pulses are generated by a chain of Schmitt trigger inverters 142, 144, 146, 148, 150, 152, 154, 156, and 158 connected with corresponding resistor-capacitor coupling networks, indicated at 160, 162, 164, 166, 168, 170, 172, and 174. The resistor-capacitor coupling networks 160–174 are configured so as to provide a desired amount of delay between the respective clock pulses. The inverter 154 provides a control signal, indicated at LED (analogous to the signal at port 70 of FIG. 1), that activates the LED 20 to generate the pulsed signal into the monitored zone Z.

The chain of inverters are fed by an oscillator circuit formed of the RC coupled inverter 142. The oscillator determines the repetition rate for the signals provided by the system of FIG. 6A. The RC coupling associated with the oscillator sets the desired timing and repetition rate of the system.

FIG. 6B illustrates an example of a simple circuit 176 for providing the initialization pulse signal INIT to the output latch 138 of FIG. 5. The circuit 176 is formed of an inverter gate 178 having an input connected to a positive voltage level V+ through a parallel connection of a diode 180 and resistor 182 which, in turn, are connected to electrical ground through a capacitor 184. Upon application of the voltage V+, the circuit of FIG. 6B generates the pulse signal INIT at the inverter output to force the output 140 of the latch 138 to a LOW state. The circuit 176 is configured so that the pulse signal INIT is generated at power up and lasts for a duration to ensure a stable operation of the system before being de-asserted.

The use of a clock pulse generation circuit formed of, for example, Schmitt triggering inverters is well known to those skilled in the art and, therefore, the details of its operation will not be described further. It also will be understood and appreciated by those skilled in the art that various other alternative arrangements may be used to provide suitable clock pulses to the digital circuit of FIG. 5. For example, a clocked shift register or counter with appropriate gating may be used to provide a fully digital implementation.

Figure 7:
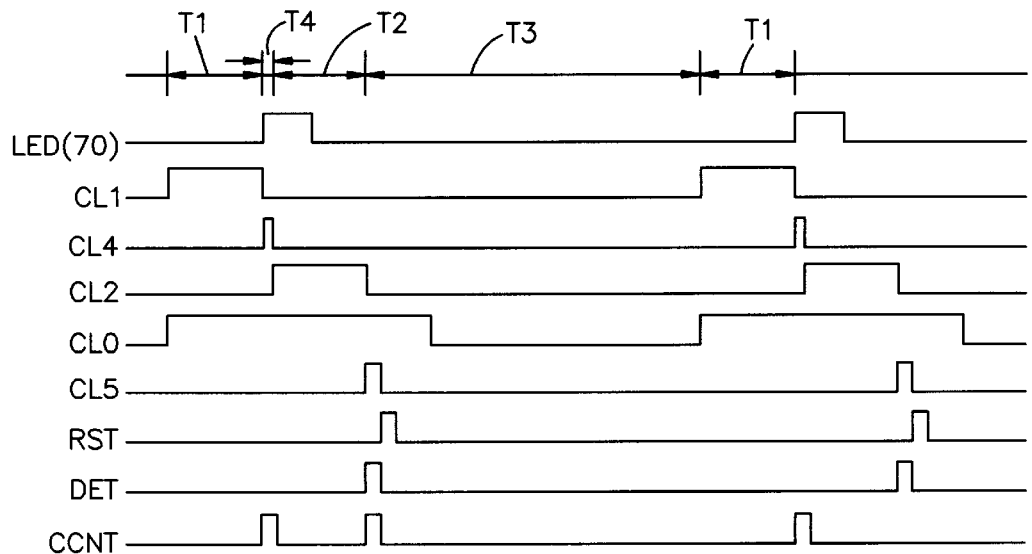
FIG. 7 is a timing diagram illustrating operation of the sensor module of FIG. 5.

The clock pulse generation circuits, such as shown in FIGS. 6A and 6B, are used to provide clock pulses that perform critical functions in the digital circuit 58' and coordinate activities of the various circuit components. Referring to FIG. 7, the counter 120 is reset or cleared at the end of each count cycle T1 and T2 by the pulse signal CCNT supplied to line 122 of the counter. The pulse signal CCNT is generated at the moments when the period T1 ends and again when T2 ends. The clock pulses CL1 and CL2 are coincident with respective intervals T1 and T2 for latching the outputs $Q_B$ and $Q_D$ into the latches 124 and 126, respectively.

The latches 124 and 126 are reset by the reset pulse signal RST from the inverter 152 which is provided at line 128. In this embodiment, the latches 124 and 126 are reset every cycle just after the state of the detect line 136 is latched into the output latch 138 by the clock pulse CL5.

In FIG. 7, the time intervals T1, T2, and T3 refer to the same intervals previously described with respect to FIGS. 1 and 3. That is, T1 refers to the time interval in which the signal noise level is assessed, T2 refers to the time interval in which the light pulse response and recovery is assessed, and T3 refers to the wait period before the next T1 occurs. A short time interval T4 provides a wait time for the duration of the clock pulse signal CL4 for the received light pulse response to establish itself in the module 10'.

For example, during period T1, the counter 120 counts the number of LOW to HIGH transitions at the output 60 of the comparator 46 while no signal is being emitted by the emitter 20. Thus, during T1, it is expected that the number of state transitions will be in excess of some predetermined number, such as eight, and the latch 126 will provide a HIGH signal at output line 132. During period T2, the counter 120 counts the transitions of the comparator output signal at 60 with a light signal from the emitter potentially being received by the photodetector 12. Thus, it is expected that, provided there is an adequate light signal being received, there will be at most one transition. Latch 124, therefore, maintains a HIGH signal at its output line 130. It will be appreciated that the counter 120 and latches 124 and 126 may be configured to respond with appropriate signals according to different count limits. The results of ANDing the signals at 130 and 132 provide a truth table according to Table 1.

TABLE 1

| 130 | 132 | 136 | RESULT |
|---|---|---|---|
| LOW | LOW | LOW | low likelihood of occurrence |
| HIGH | LOW | LOW | Low likelihood of occurrence |
| LOW | HIGH | LOW | expected result with no light signal present |
| HIGH | HIGH | HIGH | expected result with light signal present |

The desired outcome when a light pulse is incident on the photodetector diode 12 is shown at the last line of Table 1. The last line corresponds to a situation when a sufficiently high noise count is present during T1 setting the output 132 HIGH, and a light signal is present during T2, thereby not setting line 130 LOW. Consequently, the signal provided at line 136 from the AND gate 134 also is set HIGH, as expected, thereby indicating that the emitted pulse was detected. Appropriate conclusions concerning the presence or absence of an object being within the monitored zone Z are easily determined based on the logic signal provided at 136. The DET signal is subsequently latched by the output latch 138 to provide a corresponding output signal OUT at 140 indicating the presence or absence of an object within the monitored zone Z.

Figure 8:
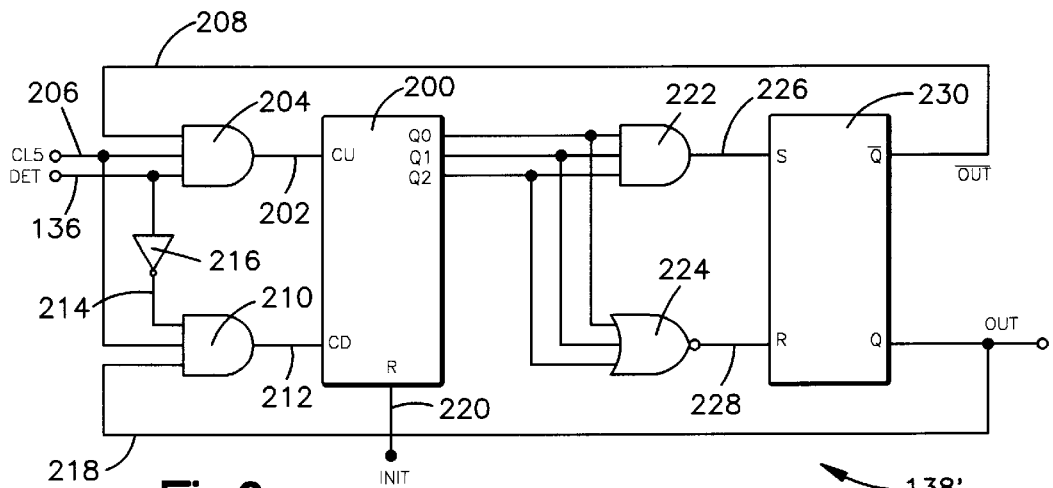
FIG. 8 is a schematic block diagram of part of a sensor module in accordance with a fourth embodiment of the present invention.

FIG. 8 illustrates an alternative arrangement of the output latch 138 of FIG. 5, indicated at 138'. This alternative arrangement of the latch 138' provides enhanced noise avoidance through an integration function. The integration function is analogous to that described with respect to the software implementation at step 106 of FIG. 4.

In FIG. 8, the digital circuit 138' utilizes a three bit binary bi-directional counter 200 responsive to the detection signal DET at line 136 of FIG. 5. The counter 200 has three outputs Q0, Q1, and Q2 that provide a three bit value indicative of the count value. The counter 200 also has an input line 220 connected to the initialization pulse signal INIT for resetting the counter 200, such as to an all zero count state when the system is powered up. The counter 200 has a first input CU for incrementing the counter value and another input CD for decrementing the counter value. The counter 200 counts up or down depending on the current count value and the detected signal at line 136.

The input CU is connected by a connection 202 to the output of an AND gate 204. The AND gate 204 has three input lines for receiving the detection signal DET at line 136, the clock pulse signal CL5 at 206, and another signal $\overline{OUT}$ at line 208, as described below. Accordingly, the value of the counter 200 is incremented when each of the signals at lines 206, 136, and 208 is HIGH.

Another AND gate 210 has an output connected to the CD input of the counter 200 by connection 212. The AND gate 210 receives as inputs the clock pulse signal CL5 at line 206, an inverted detection signal $\overline{DET}$ at 214, which is derived from inverting the DET signal at line 136 through an inverter 216. The AND gate 210 also has another input 218 (described below), which has an opposite logic value OUT to that provide at line 208. Accordingly, the counter 200 is decremented when each of the inputs 206, 214 and 218 is HIGH.

The counter output signals at Q0, Q1, and Q2 are provided to an AND gate 222 and to a NOR gate 224. The gates 222 and 224 operate on the counter output signals at Q0, Q1, and Q2 to provide corresponding logic output signals at lines 226 and 228, which are provided to respective inputs S and R of an RS flip-flop 230. The signal (S226) at 226 may be expressed as $$S226 = Q0*Q1*Q2.$$

Accordingly, when each of Q0, Q1, and Q2 is HIGH, the output signal at 226 also is HIGH which operates to set the RS flip-flop 230. Similarly, the signal at line 228 may be expressed as $$S228 = \overline{Q0}*\overline{Q1}*\overline{Q2}.$$

Thus, when each of Q0, Q1, and Q2 is LOW, the signal at 228 is HIGH. This operates to reset the RS flip-flop, thereby setting the signal OUT at line 218 LOW and setting the signal $\overline{OUT}$ at 208 HIGH.

By way of example, the counter circuit 138 of FIG. 8 operates as follows. Initially, when the module 10 is powered up, the INIT signal at line 220 resets each of the counter outputs Q0, Q1, and Q2 to LOW. The signals at Q0, Q1, and Q2 are provided to the gates 222 and 224. This resets the SR flip-flop 230, resulting in a LOW output being provided at 218 and a HIGH output at 208. Assuming, for example, that a light pulse is detected, the detection pulse signal DET at line 136 is generated. If the DET pulse is coincident with the clock pulse CL5 at line 206 while the signal $\overline{OUT}$ at line 208 is HIGH, then the counter 200 receives a count-up pulse at line 202. The counter 200, in turn, increments its count value by 1. On the other hand, if the DET pulse signal at line 136 is LOW, indicating that no light pulse is detected, then coincident with the clock pulse CL5 at line 206 being HIGH while the OUT signal at line 218 also is HIGH, the counter 200 receives a count-down pulse at line 212. This causes the counter 200 to decrement the count value by 1.

Advantageously, line 208 operates to prevent the counter 200 from incrementing its count value when the output signal at line 218 is HIGH. When the output at 218 is high, the counter has reached a predetermined count value, such as a maximum count value. As stated above, the signal OUT at line 208 is set LOW when the counter 200 is at its maximum count value. Similarly, line 218 acts to prevent the counter 200 from decrementing when the output of flip-flop 230 at line 218 is LOW, indicating the counter has reached its minimum count value. The count-up and count-down pulse signals provided at lines 202 and 212 may be expressed as follows:

$$CU202 = \overline{OUT}*CL5*DET; \text{ and}$$

$$CD212 = OUT*CL5*\overline{DET},$$

where CU202 is the signal at line 202 and CD212 is the signal at line 212.

A simplified truth table for the counter circuit of FIG. 8 is shown in Table 2 for the situation when the initial state is 0 and the maximum count value has a decimal count of 4.

TABLE 2

| DET | CU | CD | Q2 | Q1 | Q0 | OUT | Decimal Count |
|---|---|---|---|---|---|---|---|
|  | 0 | 0 | 0 | 0 | 0 | 0 | 0 |
| 0 | 0 | 0 | 0 | 0 | 0 | 0 | 0 |
| 1 | 1 | 0 | 0 | 0 | 1 | 0 | 1 |
| 1 | 1 | 0 | 0 | 1 | 0 | 0 | 2 |
| 0 | 0 | 1 | 0 | 0 | 1 | 0 | 1 |

TABLE 2-continued

| DET | CU | CD | Q2 | Q1 | Q0 | OUT | Decimal Count |
|-----|-----|-----|-----|-----|-----|-----|------|
| 1 | 1 | 0 | 0 | 1 | 0 | 0 | 2 |
| 1 | 1 | 0 | 0 | 1 | 1 | 0 | 3 |
| 1 | 1 | 0 | 1 | 0 | 0 | 1 | 4 |
| 1 | 0 | 0 | 1 | 0 | 0 | 1 | 4 |
| 0 | 0 | 1 | 0 | 1 | 1 | 1 | 3 |
| 0 | 0 | 1 | 0 | 1 | 0 | 1 | 2 |
| 1 | 1 | 0 | 0 | 1 | 1 | 1 | 3 |
| 0 | 0 | 1 | 0 | 1 | 0 | 1 | 2 |
| 0 | 0 | 1 | 0 | 0 | 1 | 1 | 1 |
| 0 | 0 | 1 | 0 | 0 | 0 | 0 | 0 |
| 0 | 0 | 0 | 0 | 0 | 0 | 0 | 0 |

Figure 9:
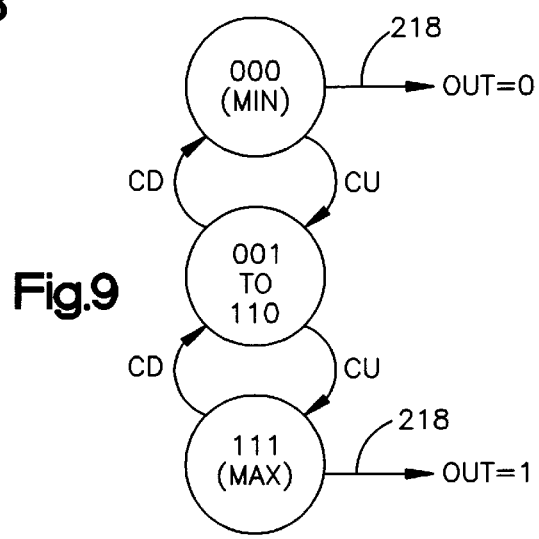
FIG. 9 is a state diagram illustrating part of the operation of a sensor module in accordance with a fifth embodiment of the present invention.

FIG. 9 is a state diagram illustrating an integration function, such as for a counter circuit 138', having a maximum count value of 7 and a minimum count value of 0. The state diagram and Table 2 collectively illustrate how a count value may change over a plurality of time intervals for the situation when sequential light pulses are incident on the photodetector 12 as well as when light pulses are absent. In particular, when the DET signal at line 136 is HIGH, the counter 200 increments up to its maximum value, which in Table 2 is four and in the state diagram is seven. Once at the maximum value, the counter 200 maintains the maximum value until a countdown pulse is received at 212. This prevents wraparound of the counter. Similarly, when the DET pulse signal at 136 is LOW, the counter 200 decrements to the minimum value, which is zero for both Table 2 and the state diagram of FIG. 9. Upon reaching the minimum value, the counter 200 does not decrement any further, also to prevent counter wraparound.

This arrangement also provides the advantage that the minimum and maximum count values may be selected as a matter of design choice to achieve a suitable level of accuracy. That is, the degree to which immunity against spurious changes in the DET signal caused by noise can be avoided by varying the minimum and maximum count values.

From the above description of the invention, those skilled in the art will perceive improvements, changes and modifications. For example, numerous other circuit arrangements and combinations of hardware and software may be used to implement a module in accordance with the present invention. Furthermore, each such implementation may utilize various other transfer functions to provide additional filtering or otherwise vary the signal response provided to the comparator. Such filters further may be implemented as analog or digital filters, such as within a microcontroller or part of the comparator circuit. Such improvements, changes and modifications within the skill of the art are intended to be covered by the appended claims.

Having described the invention, the following is claimed:

1. A sensor module comprising:
   a sensor operative to sense a condition of a monitored zone and provide a sensor signal having an electrical characteristic which varies as a function of the sensed condition;
   a first circuit operative to perform a first transfer function operation on the sensor signal and provide a first signal having a characteristic that varies as a function of the sensor signal;
   a second circuit operative to perform a second transfer function operation on the sensor signal and provide a second signal having a characteristic that varies as a function of the sensor signal;
   a comparator operative to compare the first and second signals and provide a comparator output signal having a characteristic that varies between at least two conditions as a function of the first and second signals; and
   a third circuit operative to determine an indication of the number of transitions between the at least two conditions of the comparator output signal, said third circuit operative to determine a change in the condition of monitored zone indicative of the presence or absence of an object within the monitored zone based on the indication of the number of transitions between the at least two conditions of the comparator output signal.

2. An apparatus as set forth in claim 1 further including an emitter operative to emit a pulsed signal into the monitored zone to effect the change in the condition of the monitored zone.

3. An apparatus as set forth in claim 2 wherein said emitter is an optical emitter which emits a pulsed light signal into the monitored zone and said sensor is an optical detector which is operative to detect light in the monitored zone, said optical detector providing the sensor signal having an electrical characteristic that varies as a function of the light detected in the monitored zone.

4. An apparatus as set forth in claim 3 wherein said third circuit controls said optical emitter to emit the pulsed light signal.

5. An apparatus as set forth in claim 2 wherein said third circuit determines a first value indicative of the number of transitions between the at least two conditions of the comparator output signal when no pulsed signal is being emitted by said emitter and determines a second value indicative of the number of transitions between the at least two conditions of the comparator output signal during at least a time period when said emitter is emitting the pulsed signal, said third circuit providing an indication of the presence or absence of an object within the monitored zone based on a ratio or difference of the first and second values.

6. An apparatus as set forth in claim 1 wherein said third circuit is operative to determine a first value indicative of the number of transitions between the at least two conditions of the comparator output signal over a first time period and operative to determine a second value indicative of the number of transitions between the at least two conditions of the comparator output signal over a second time period, said third circuit providing an indication of the presence of an object within the monitored zone based on a ratio or difference of the first and second values.

7. An apparatus as set forth in claim 6 wherein the ratio or difference of the first and second values has a ratio or difference value and said third circuit provides an indication of the presence or absence of an object within the monitored zone based on a comparison of the ratio or difference value and a threshold value.

8. An apparatus as set forth in claim 6 wherein said third circuit determines a first transition rate indicative of the first value divided by the first time period and a second transition rate indicative of the second value divided by the second time period, said third circuit determining a ratio or difference value that varies as a function of the first and second transition rates, an indication of the presence or absence of an object within the monitored zone being determined based on the ratio or difference value.

9. An apparatus as set forth in claim 8 wherein said third circuit compares the ratio or difference value and a threshold value for a plurality of measure measurement intervals, said third circuit modifying a count value based on each comparison between the ratio or difference value and the threshold value, said third circuit having an output that provides a detection signal indicative of the presence or absence of an object within the monitored zone as a function of the count value.

10. An apparatus as set forth in claim 9 wherein said third circuit provides a detection signal having a first electrical characteristic in response to the count value reaching a first count value, said third circuit providing a detection signal having a second electrical characteristic in response to the count value reaching a second count value.

11. An apparatus as set forth in claim 1 wherein one of the at least two conditions of the comparator output signal corresponds to the comparator output signal having a value less than a reference signal level and the other of the at least two conditions of the comparator output signal corresponds to the comparator output signal having a value greater than the reference signal level.

12. An apparatus as set forth in claim 11 wherein each transition between the at least two conditions of the comparator output signal corresponds to the comparator output signal crossing the reference signal level.

13. An apparatus as set forth in claim 1 wherein said first circuit includes a first network having the first transfer function, said second circuit includes a second network having the second transfer function which is different from the first transfer function.

14. A sensing apparatus comprising:
   a sensor operative to sense a condition of a monitored zone and provide a sensor signal indicative thereof;
   means for processing said sensor signal to provide first and second signals, each of said first and second signals having a characteristic that varies differently as a function of the sensor signal;
   a comparator operative to compare the first and second signals and to provide a comparator signal which varies between at least two conditions as a function of the first and second signals; and
   circuitry responsive to said comparator signal and operative to provide a signal indicative of the presence or absence of an object within the monitored zone based on detecting transitions between said at least two conditions of the comparator signal.

15. An apparatus as set forth in claim 14 wherein said circuitry is operative to determine a value indicative of the number of transitions between said at least two conditions of said comparator signal, said circuitry providing an indication of the presence or absence of the object within the monitored zone based on the determined value.

16. An apparatus as set forth in claim 15 wherein said circuitry is operative to determine a first value indicative of the number of transitions between said at least two conditions of said comparator output signal over a first time period and operative to determine a second value indicative of the number of transitions between the at least two conditions of said comparator output signal over a second time period, said circuitry providing a signal indicative of the presence or absence of an object within the monitored zone based on a ratio or difference of the first and second values.

17. An apparatus as set forth in claim 16 wherein the ratio of the first and second values has a ratio or difference value and said circuitry provides the signal indicative of the presence or absence of an object within the monitored zone based on a comparison of the ratio or difference value and a threshold value.

18. An apparatus as set forth in claim 14 wherein said means for processing includes a circuit having two different transfer functions that operate on the sensor signal to provide the first and second signals.

19. An apparatus as set forth in claim 18 wherein said circuit having two different transfer functions further includes a first network having a first transfer function that operates on the sensor signal to provide the first signal and a second network having a second transfer function, which is different from the first transfer function, that operates on the sensor signal to provide the second signal.

20. A method for detecting the presence or absence of an object within a monitored zone, said method comprising the steps of:
   sensing a condition of the monitored zone;
   providing a sensor signal indicative of the sensed condition;
   performing transfer function operations on the sensor signal to provide first and second processed signals;
   comparing the first and second processed signals to provide a comparison signal having a characteristic that varies between at least two conditions as a function of the first and second processed signals;
   detecting transitions between the at least two conditions of the comparison signal; and
   providing an indication of the presence or absence of the object within the monitored zone as a function of the detected transitions.

21. A method as set forth in claim 20 further including the step of determining a first value indicative of a number of the transitions between the at least two conditions of the comparison signal over a first time interval and determining a second value indicative of a number of transitions between the at least two conditions of the comparison signal over a second time interval, providing a signal indicative of the presence or absence of the object within the monitored zone as a function of a ratio or difference of the first and second values.

22. A method as set forth in claim 21 wherein said step of determining further includes determining a ratio of the first and second values for each of a plurality of consecutive measurement intervals, each measurement interval being defined by the first and second time intervals, said method further including the step of providing a detection signal having a characteristic indicative of the presence or absence of the object within the monitored zone based on the ratio or difference of the first and second values over a plurality of the measurement intervals.

23. A method as set forth in claim 22 further including the steps of modifying a count value in a first direction when the ratio or difference of the first and second values has a value less than a threshold value and modifying the count value in a second direction when the ratio or difference has a value greater than or equal to the threshold value, and providing the detection signal having a characteristic indicative of the presence or absence of the object within the monitored zone as a function of the count value.

24. A method as set forth in claim 23 further including the steps of providing a first detection signal when the count value reaches a first count value and providing a second detection signal when the count value reaches a second count value.

25. A method as set forth in claim 20 wherein each of the first and second processed signals varies differently in response to the sensor signal.

26. A method as set forth in claim 25 wherein said step of performing transfer function operations on the sensor signal further includes the steps of transforming the sensor signal with a first network having a first transfer function to provide the first processed signal and transforming the sensor signal with a second network having a second transfer function to provide the second processed signal.

* * * * *